Dec. 11, 1962  P. BAUMGARTNER  3,067,572
PROCESS FOR CONVERTING LIGHT ENERGY TO MECHANICAL POWER
Filed March 29, 1960  4 Sheets-Sheet 1
FIG. 6
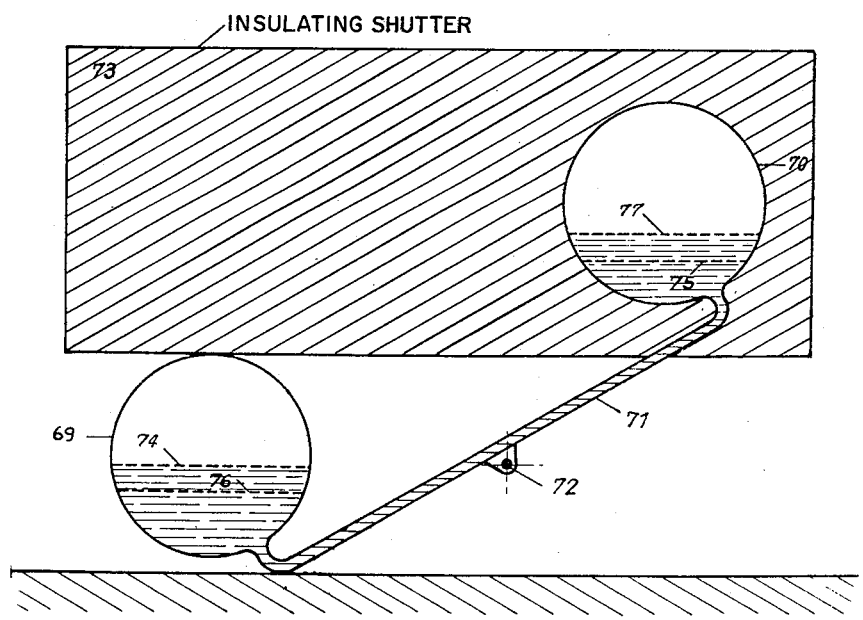
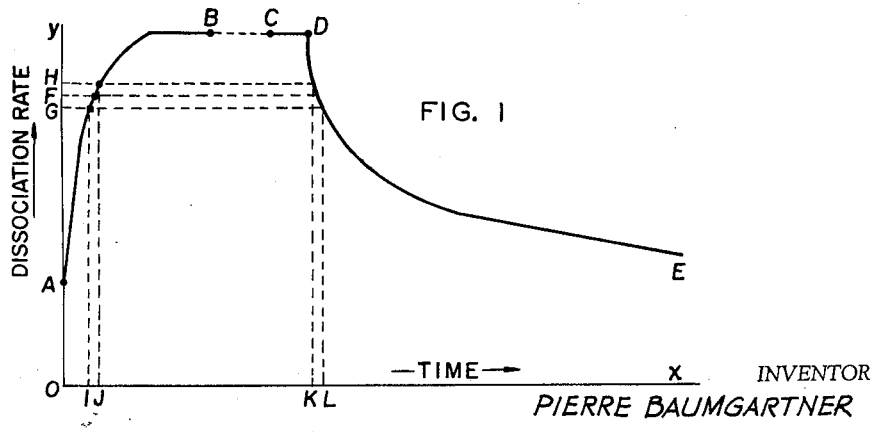
INVENTOR
PIERRE BAUMGARTNER
BY *Toulmin & Toulmin*
ATTORNEYS Dec. 11, 1962   P. BAUMGARTNER   3,067,572
PROCESS FOR CONVERTING LIGHT ENERGY TO MECHANICAL POWER
Filed March 29, 1960   4 Sheets-Sheet 4

INVENTOR
PIERRE BAUMGARTNER

BY Toulmin & Toulmin

ATTORNEYS

3,067,572
PROCESS FOR CONVERTING LIGHT ENERGY TO MECHANICAL POWER

Pierre Baumgartner, Asnieres, France, assignor to Institut Francais du Petrole des Carburants et Lubrifiants, Paris, France
Filed Mar. 29, 1960, Ser. No. 18,305
Claims priority, application France Apr. 3, 1959
9 Claims. (Cl. 60—25)

The present invention relates to a new and useful process for converting light energy and particularly energy of sun rays into mechanical energy.

Until now such a direct conversion of light energy to mechanical energy could not be achieved since only production of electric current by use of photocells was carried out, which electric current may in turn be converted to mechanical energy.

The new process according to this invention provides a direct and more simple method of converting the light energy to mechanical energy without the intermediate steps of conversion into an electric current, and therefore leads to much better yields, i.e. to the recovery of a greater portion of the initial energy available in the form of light.

It is therefore the principal object of this invention to provide a novel and improved process and apparatus to convert light energy to mechanical energy, i.e. physical motion.

Another object is to carry out this conversion without intermediary steps of conversion of the light energy to electric current.

A further object of my invention is to provide a self-contained apparatus continuously delivering mechanical energy when exposed to light and particularly to sun rays.

A still further object of this invention is to provide a self-operating light governor which does not require the use of any electrical device.

The present invention is based on the discovery that the photo-chemical dissociation of nitrosyl chloride to nitrogen oxide and chlorine is accompanied by an increase in volume and/or pressure and that the inverse reaction of the recombination of nitrogen oxide and chlorine to nitrosyl chloride occurs in the dark and is accompanied by a reduction of the volume of the gaseous mixture.

The nitrosyl chloride is dissociated under the action of light according to the following reaction:

(I) $\quad 2NOCl \rightarrow 2NO + Cl_2$ which leads, under constant pressure, to an increase in volume by 50 percent of the converted NOCl. However, this reaction is far from being complete and the conversion of NOCl is limited by the reverse reaction which also takes place:

(II) $\quad 2NO + Cl_2 \rightarrow 2NOCl$ which latter reaction leads to a decrease of volume, under unchanged pressure conditions, by $\frac{1}{3}$ of the converted starting mixture. Thus, in the presence of light, the two preceding reactions are competitive and the reaction of dissociation of nitrosyl chloride is therefore an equilibrated reaction as follows:

(III) $\quad 2NOCl \rightleftharpoons 2NO + Cl_2$

In the accompanying drawings:

FIGURE 1 shows the curves representative of the variations of the nitrosyl chloride dissociation rate (ABCD) and of the rate of recombination of chlorine with nitrogen oxide (DE);

FIGURE 6 shows another apparatus for converting light energy to mechanical energy.

Figure 2:
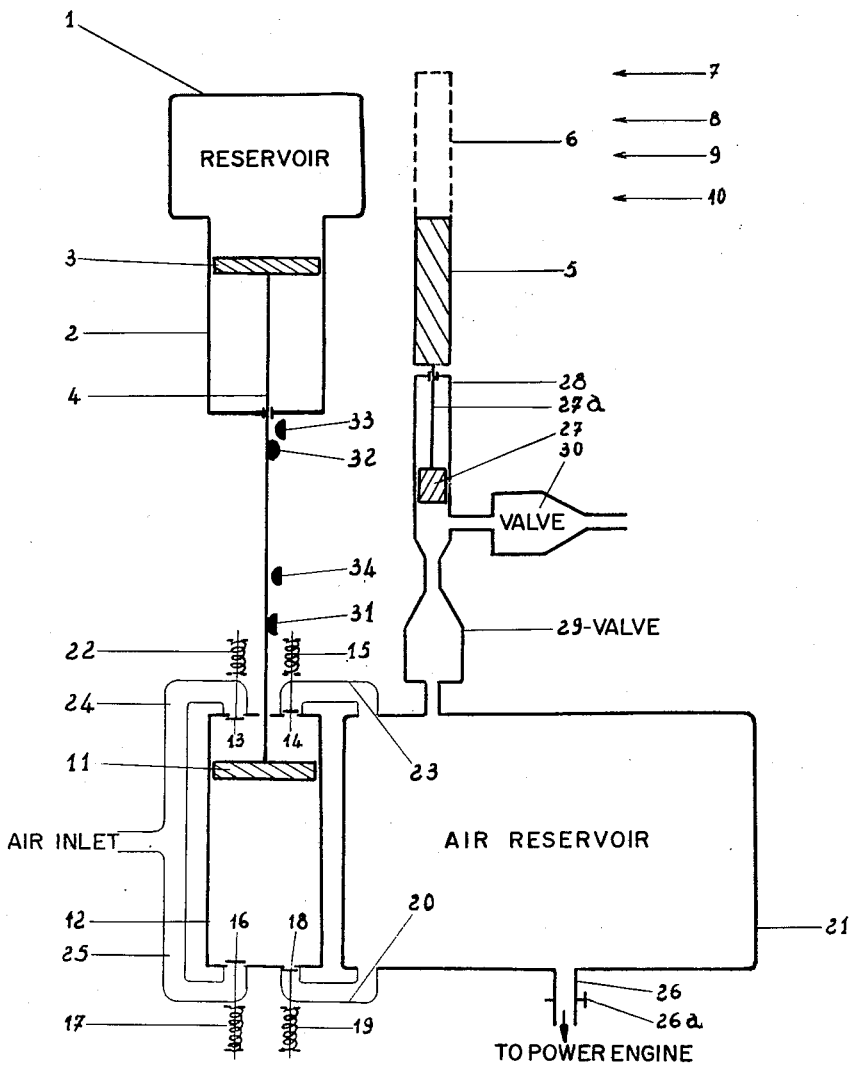
FIGURE 2 shows one of the preferred embodiments of apparatus for carrying out the conversion of light energy to mechanical energy according to the present invention.

It is observed that said reaction is purely of a photochemical type since in the absence of light, under normal temperature conditions, such a dissociation practically does not occur.

The process according to my invention, when carried out in a continuous manner comprises successive steps of irradiating nitrosyl chloride contained within an enclosed space which does not absorb said radiations and of interrupting periodically said irradiation. The time of exposure to the light radiations must be sufficient to increase significantly the volume and/or pressure into said enclosed space, the latter being associated to a mechanical device of conventional type for converting said increase in volume and/or pressure to mechanical energy. Exposure to irradiation is thereafter interrupted for a delay which must be sufficient for carrying out a substantial decrease in the volume and/or pressure into the enclosed space.

Thus alternating steps of expansion and reduction of volume are obtained which are easily converted to reciprocating motion, for instance by the means of the motion of a piston which may be made of a liquid as well as of a solid matter.

The process according to my invention is of particular advantage for carrying out regulations of the light intensity as well as for operation of automatic control devices which it is desired to associate to changes of light intensity.

Such a regulation of the light intensity may be achieved for instance by using mechanical energy obtained by conversion of light energy according to my invention, for automatically operating, for instance, window-curtains or blinds such as awning-blinds, shutters, etc., in any location where it is desired to maintain a substantially constant flow of light. By this way building curtains may be drawn, or blinds closed, automatically when strongly illuminated by solar energy and progressively reopened as soon as solar intensity decreases. Similarly automatic operation of greenhouse shades may protect from excessive solar illumination some species of plants which are particularly sensitive to the sunlight.

The mechanical energy produced from light energy may also be used for operating switches which open or close circuits controlling various devices such as buildings or streets lighting when day-light vanishes.

However, in view of obtaining large amounts of mechanical energy it is preferred to provide for periodical changes of the light intensity acting on nitrosyl chloride. Such changes of light intensity are easily obtained by periodically interrupting the flow of light by means of a device energized by said mechanical energy. Light radiations of any wave length are convenient for carrying out the photochemical reaction according to Reaction I supra.

However, the only radiations having a wave length of less than 7500 A. provide a sufficient amount of energy to cause nitrosyl chloride dissociation.

Practically only radiations having wave lengths lower than 6500 A. are to be used if a good output is expected. Besides, although there is no lower limit to the wave length of radiations since ultra violet, X- and gamma rays as well as accelerated electrons proved to be effective, optimum economical conditions are of course that corresponding to the use of sun rays.

It is noticeable that the photochemical yield of radiations is dependent on the rate of their absorption by nitrosyl chloride. It has been observed that the lower the wave length of the radiation, the higher is the absorption. It is therefore of greatest advantage to use ultraviolet, blue or green rays than yellow or red rays which are of higher wave lengths.

The enclosed space or receptacle containing nitrosyl chloride must be made of a material resistant to the action of said compound and its decomposition products and which does not absorb much of the radiations, such as, for instance glass or tetrafluoroethylene when using sun rays.

The nitrosyl chloride may be used in the gaseous state at any pressure. The use of atmospheric pressure may be preferred for economic reasons but supra-atmospheric pressures may be advantageous due to a better absorption of the radiations per volume unit.

Gaseous nitrosyl chloride may also be used in solution into a solvent so selected that at least one of the dissociation products, i.e. either chlorine or nitrogen oxide is not substantially dissolved in said solvent.

Under the action of light, that dissociation product which is insoluble in the solvent, will be liberated in the gaseous form and will substantially increase the volume and/or pressure in the receptacle. On the contrary, in the dark, the recombination of chlorine with nitrogen oxide will give nitrosyl chloride which will be dissolved in the solvent. Carbon tetrachloride is an example of a suitable solvent for the purpose of this invention since nitrogen oxide cannot be substantially dissolved therein and it is a good solvent for nitrosyl chloride.

The photochemical process according to this invention may be operated within a wide temperature range and the only temperature limits to be observed are those resulting from the inherent nature and thermic resistance of the products and materials used. Provided that said upper limits are sufficiently high, temperature evolution during the reaction is not prejudicial to the latter.

The mechanical device for converting volume and/or pressure changes to power may be a conventional one, such as, for instance, that used in thermal engines, comprising a piston associated with a connecting-rod and driving a wheel, a crankshaft, a turbine or any other equivalent device.

The darkening device for periodically interrupting the exposure of the receptacle containing nitrosyl chloride to the light is a conventional one and does not require a particular description. A curtain, shutter, blind or any other device made of a non-transparent material may be used, for instance.

According to fundamental research that has been carried out in the field of the present invention, it has been established that the velocity of the photochemical dissociation of nitrosyl chloride was given by the following formula:

$$V_d = D_y \cdot E$$

wherein $V_d$ is the velocity of dissociation $D_y$ is the quantitative yield of dissociation (2 in the present case) and E is the light energy absorbed by the nitrosyl chloride.

Similarly the velocity of the reaction of combination of chlorine with nitrogen oxide is given by the formula:

$$V_c = k[Cl_2][NO]^2$$

wherein $V_c$ is the velocity of combination and $k$ is a constant. Since the two inverse reactions occur simultaneously, the resulting net velocity of the overall reaction will be:

$$V = D_y \cdot E - k[Cl_2][NO]^2$$

The dissociation rate of nitrosyl chloride in the presence of light, according to Equation III supra, may be plotted against time in the form of a curve of the type of portion of curve ABCD of FIGURE 1. On this figure time is indicated on the $o-x$ axis and the dissociation rate of nitrosyl chloride on the $o-y$ axis. This dissociation rate may be easily computed from the measure of the corresponding pressure into the receptacle.

Point A corresponds to a zero dissociation rate and to a pressure $P_A$. According to the curve portion ABCD of FIGURE 1 the net dissociation rate tends to an asymptotic limit which corresponds to equal velocities of photochemical dissociation according to Equation I supra and of recombination according to Equation II. The dissociation rate corresponding to said asymptotic equilibrium of the two above mentioned reactions produces in the receptacle a pressure $P_Q$, which will be designated as equilibrium pressure. If, at the time corresponding to point D of the curve, the flow of light is interrupted, only reaction according to Equation II will further occur. According to FIGURE 1 the portion DE of the curve shows as a function of time the changes in the recombination rate of chlorine with nitrogen oxide to nitrosyl chloride, starting from the moment where the light flow is interrupted.

Though the operating conditions of the process according to this invention may be selected at will, it is preferred, in view of obtaining the maximum yield, to carry out reactions of decomposition and recombination respectively between two dissociation rates of the nitrosyl chloride close to the dissociation rate F at which the slopes of the two portions AB and DE of the curve are substantially the same in absolute value but are in opposite directions. The reactions, for instance, will evolve between the rates of decomposition G and H and the periods of exposure to light and darkening will thus be respectively chosen equal to IJ and KL.

Computations made on the basis of the basic equations hereabove mentioned give an approximate value of the pressure $P_F$ corresponding to a dissociation rate of F. This value, expressed as a function of the pressure $P_A$, prevailing before occurrence of the dissociation phenomena, and of the pressure $P_Q$ corresponding to the optimum limit value of the dissociation rate according to Equation III, is the following:

$$P_F = 0.794 \, P_Q + 0.206 \, P_A$$

The pressures obtained by dissociation of the nitrosyl chloride according to the invention are considerably higher than that which would result from a mere thermal effect of light radiations on gases, since, when using under the same conditions another gas than nitrosyl chloride such thermal effect of light radiations results in a far lower change of volume of gases than in the case of nitrosyl chloride.

Following examples are illustrative of various embodiments of the present invention, which however are not limitative of the scope of the latter. Corresponding devices are shown in FIGURES 2 to 6.

A first embodiment of apparatus for carrying out the invention is shown in FIGURE 2. Said apparatus comprises a transparent reservoir 1 containing gaseous nitrosyl chloride under a given pressure and connected to a cylinder 2 in which a movable piston 3 may be displaced by a pressure change in the reservoir 1. Said piston is rigidly locked through the stem 4 to another piston 11, movable in the cylinder 12, provided at the upper and lower ends thereof with inlet valves 13 and 16 and outlet valves 14 and 18, said piston in said cylinder acting as a lift-and-force-pump. A drop-shutter 5 (shown at rest on FIGURE 2) may be periodically placed in the position shown by FIGURE 2 in dotted lines 6 so as to prevent the access of light rays in direction of arrows (7, 8, 9, 10) to the reservoir 1. The displacement of the drop-shutter 5 is controlled by means of a device actuated by the stem 4 when piston 3 or piston 11 is close to one end of its stroke (see FIG. 3).

The operation of this apparatus is as follows:

Just after the drop-shutter has taken position 5 piston 3 is pushed away downward by expansion of the gaseous volume contained in reservoir 1 as a result of photochemical dissociation of nitrosyl chloride according to Equation III. The corresponding displacement of piston 11 rigidly locked to piston 3 provides a fall of pressure in the upper part of cylinder 12 accompanied with a pressure increase in the lower part of the latter. The upper inlet of cylinder 12 previously closed by means of the valve 13 maintained by the spring 22 is now opened, due to the suction effect produced by the downward movement of piston 11 and the upper outlet, valve 14 previously opened for liberating gases under pressure, is now closed, due to the action of the spring 15 of the outlet valve 14. Fresh air is consequently introduced into the cylinder through pipe 24 when piston 11 moves downward.

On the contrary, in the lower part of the cylinder, at the end of the suction step, valve 16, actuated by the spring 17, closes the inlet of gases into the cylinder while the pressure increases in this part of the cylinder up to the adjusting pressure of valve 18, previously closed by the combined effect of the spring 19 and of the high pressure prevailing in the pipe 20 freely communicating with reservoir 21.

Figure 3:
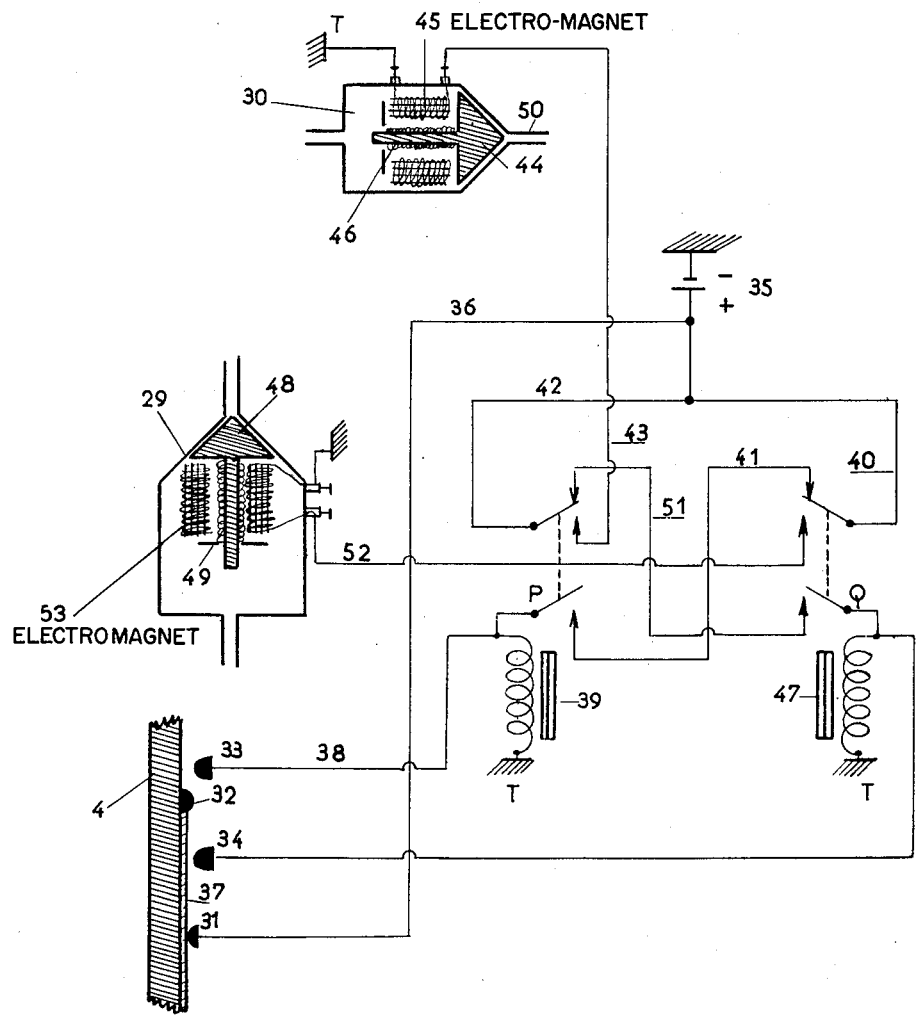
FIGURE 3 shows an enlarged view of the electrical part of the device of FIGURE 2.

Substantially at the end of the stroke of the pistons 3 and 11 the stem 4 actuates an electrical device which controls by means of the electro-valve 29 the pushing of the drop-shutter to the upper position 6 (see FIG. 3). From this moment the reaction of dissociation according to Equation III is stopped and the only recombination reaction of chlorine with nitrogen oxide according to Equation II still occurs. Said recombination reaction results in an upward displacement of piston 3 into cylinder 2 due to the suction effect provided by the decrease in volume of gases contained in reservoir 1, which displacement is accompanied by a similar one of piston 11 rigidly locked by means of stem 4 to piston 3. This upward motion will close the inlet valve 13 and the outlet valve 18 while, when a sufficient pressure is attained in the upper part of cylinder 12, together with a corresponding pressure decrease in the lower part of the latter, valves 14 and 16 open. Fresh air is thus introduced in the lower part of the cylinder through pipe 25 while air previously introduced through pipe 24 in the upper part of said cylinder is compressed therein and by the opening of valve 14 is thereafter forced in reservoir 21 through pipe 23.

Substantially at the end of its upward stroke, piston 3, by means of the corresponding displacement of stem 4, actuates an electrical device, which controls by means of the electro-valve 30 the liberation of compressed gases contained in cylinder 28 (FIG. 3), which maintained the drop-shutter in its upper position. The drop-shutter will therefore come back again by gravity, to its lower position 5, corresponding to the beginning of a new work cycle.

Compressed gases accumulated into reservoir 21 may be delivered through outlet port 26, by opening of the tap 26a, to a turbine or any other power engine using gas expansion.

During its displacements, the metallic stem 4 is kept in permanent contact with the contactor 31 fed with electric current from source 35 (FIGURE 3). The electric circuit may be closed, by means of a plug 32, associated to a metallic conductor plate 37 supported by the stem 4, coming into contact with one of the two fixed contactors 33 or 34 at each end of stroke of piston 3.

Further details of the electric circuits actuating electro-valves are shown in FIGURE 3. When plug 32 registers with contactor 33, electric current, provided by the source of current 35 feeds the circuit 36—31—33—38—39—T the relay 39 of which actuates the double-switch P, which, in turn, closes circuit 40—41—39 keeping said relay 39 in constant operation. Simultaneously the switch P closes the circuit (42—43—45—T) operating the electro-magnet 45 drawing back the needle 44 thus opening the valve 30. The needle 44 in rest position is pushed by spring 46 against the corresponding core-shaped inner wall of the valve 30, thus closing the latter.

As simultaneously relay 47 is at its rest position as shown in FIGURE 3, the needle 48, pushed by the spring 49 keeps the valve 29 closed. The compressed air, previously maintaining piston 27 at its upper position (FIGURE 2) is now discharged through the outlet port 50. The drop-shutter thus comes back to its lower position 5 by gravity, pushing downward piston 27 to which it is associated by means of the stem 27a.

When plug 32 registers with contactor 34 the relay 47 being worked up, actuates the double switch Q, interrupting holding circuit 40—41 of relay 39 and the switch P, drawn back by a spring (not shown in the figure), comes again to its rest position. Circuit (43—45—T) is no more energized with current and the spring 46 pushes the needle 44 which closes port 50.

The closing of relay 47 secures both holding circuit through current feeding by means of circuit (42—51) and the current feeding of circuit (40—52) operating the electro-magnet 53 so as to provide opening of the valve 29. The compressed gases of reservoir 21 thus push away piston 27 and the drop-shutter comes back to its upper position 6.

When the plug 32 again registers with contactor 33 a new work cycle begins.

The above described embodiment of apparatus is susceptible to modifications without departing from the spirit of my invention. Thus the compression of gases may be carried out in a two or more stages apparatus, thus providing gases at a predetermined compression rate; instead of the mere accumulation step into the reservoir 21. The plug and contactor system may be replaced by any other equivalent device such as a two-way switch (shown in FIGURE 4), actuated by the displacement of two quick-action cams 55 and 56, supported by the stem 4.

The terminal 57 of the switch is directly connected to the source of current 35 while the two other terminals 58 and 59 are respectively connected to electrovalves 29 and 30.

It may be of interset to use the mechanical energy produced according to the method of my invention to lift and/or force any other fluid than air and particularly water; thus carrying out an economical device for irrigation, well adapted for operation in tropical countries wherein solar energy is very intense. It is also possible to replace the pneumatic or hydraulic device actuating the drop-shutter by an electric motor. A direct conversion of the motion of piston 3 to mechanical energy, without using an intermediary step of gas compression, may also be provided by using the combination of a wheel-crank with a connecting-rod instead of the stem 4.

In the particular embodiment of apparatus shown in FIGURE 2, piston 3 may also be replaced by any movable and sealing piece such as for example a membrane, a layer of liquid which is inert to the action of chlorine, nitrogen oxide or nitrosyl chloride, or any other equivalent device.

It is also possible to associate some of the various mechanical devices hereabove described and particularly separate units, the work cycles of which are not in phase with each other so as to provide on a common shaft a more regular torque.

The electrical energy consumed in the auxiliary circuits as hereabove described with particular reference to FIGURE 3, usually constitutes only a very small portion of the energy available by dissociation of and recombination to nitrosyl chloride and said electrical energy may be easily obtained by conversion of a minor part of the mechanical energy produced.

Figures 4, 5:
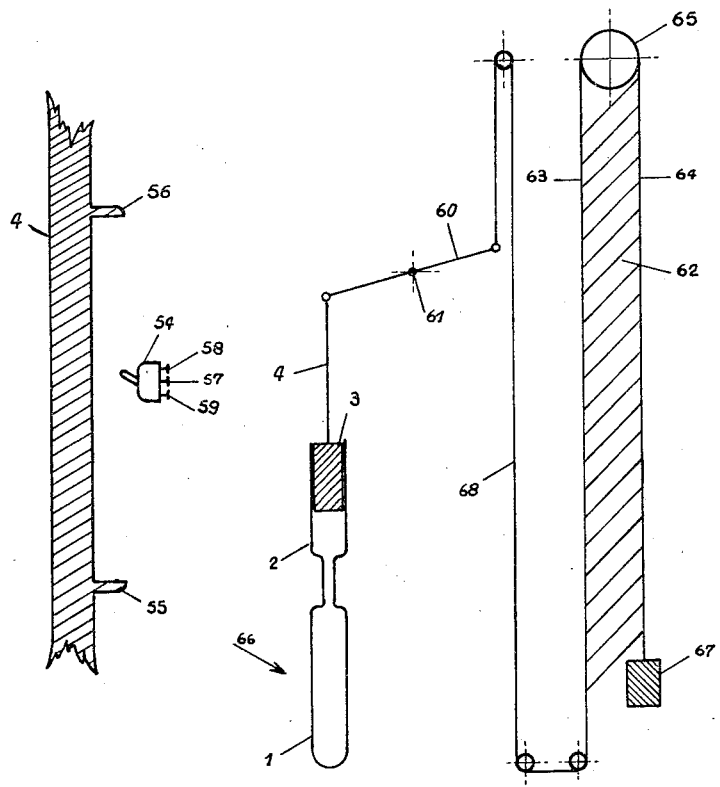
FIGURE 4 shows a particular device for operating a switch at a given light intensity.
FIGURE 5 shows an embodiment of apparatus for directly operating Venetian blinds or shutters.

FIGURE 5 shows as example another embodiment of apparatus according to my invention providing the direct operation of a Venetian blind or shutter controlled by the changes in the sunlight intensity.

According to this figure the transparent reservoir 1 filled with gaseous nitrosyl chloride, is communicating with a cylinder 2 provided with a movable piston 3 rigidly associated with a stem 4 which actuates a lever-arm 60 turning about axis 61. This lever arm is connected by means of a flexible cable 68 to the lower end of one of the two branches of the tilting device of the slats 62 of the Venetian blind, which slats are in a plane transverse to that of FIGURE 5 and are assembled by means of fabric bands passing over the pulley 65 and stretched by action of the counterweight 67.

Under action of light rays of a given intensity, the slats of the Venetian blind come to an equilibrium position. If the light intensity increases, piston 3 is pushed upward, drawing the cable 68, which results in tilting of the slats corresponding to a reduction of the passage of light through the Venetian blind. On the contrary a decrease in the light intensity results in a downward movement of piston 3 releasing cable 68 and accompanied with an increase of the passage of light through the Venetian blind due to the action of the mass 67. The quantity of light passing through the Venetian blind is therefore in inverse relation to the intensity of light and the regulation device of the type shown in FIGURE 5 thus provides for a substantially constant light intensity behind the blind when the intensity of light outside varies within certain limits.

The above described embodiment of apparatus for regulation of the light intensity may be susceptible to alterations without departing from the scope of the present invention. Thus for instance the Venetian blind may be replaced by any other device providing progressive darkening such as window-curtains, awning blinds, roller-blinds, vertical louvres, and the like.

Another embodiment of apparatus for carrying out the invention, shown in FIGURE 6, is illustrative of the use of a liquid acting as a piston. It comprises two glass balloon-flasks (69 and 70) permanently connected together through a hollow stem 71 which may swing about an axis 72 located below the middle part of the stem 71. A shutter 73 insulates each of the two balloons 69 and 70 in turn. Said balloons are partly filled with a liquid which is chemically inert in the presence of gaseous nitrosyl chloride or of any of its decomposition products, either in the dark or when irradiated with light.

A liquid corresponding to these requirements such as phosphoric acid saturated with nitrosyl chloride, may be used in the embodiment of apparatus shown in FIGURE 6 in lieu of piston. The free space, above the mass of liquid is fulfilled with gaseous nitrosyl chloride.

The operation of the apparatus is as follows: When starting the operation the respective levels of liquid in the two balloons are as shown in FIGURE 6, i.e. level 74 in balloon 69 and level 75 in balloon 70. A displacement of the liquid from balloon 69 to balloon 70 thus occurs through the hollow stem 71 as a consequence of the combined effects of two phenomena:

(1) The effect of nitrosyl dissociation in balloon 69 due to light radiations, which effect results in the forcing of the liquid out of said balloon.

(2) The effect of the inverse recombination reaction in balloon 70 which, previously exposed to the light, is now in the dark. This recombination reaction also favors a displacement of liquid from balloon 69 to balloon 70.

When the liquid reaches the respective levels of 76 in balloon 69 and 77 in balloon 70 the whole system consisting of the two balloons and their connecting stem rotates on the axis 72 and balloon 70 is thereafter exposed to the light while balloon 69 is protected from the latter by the shutter 73. The same phenomena will then occur and provide a new rotation of the system in opposite direction. An alternative movement is thus obtained on the axis 72.

It must be understood, however, that the above description is not to be considered as complete but only as a schematic one since other phenomena do occur, such as a minor liquid displacement due to the effect of gravity, but they do not change however the basic mechanism of operation of the apparatus.

The embodiment of apparatus illustrated by FIGURE 6 may be adavntageously associated with a mechanical device, not shown in the figure, for use of the mechanical energy produced. Such a device may for instance consist of a ratchet-wheel.

It may also be of interest to position the axis 72 at some distance below the hollow stem 71 so as to avoid the stopping of the apparatus at its equilibrium position corresponding to a horizontal position of the stem. For the same reasons it may be advantageous to associate with the hollow stem 71, in a direction perpendicular to the latter, a supplemental mass placed substantially above the axis 72, or to use a liquid of relatively high viscosity or a hollow stem of low inner diameter so as to prevent any hydraulic equilibrium at any moment of the rotation about axis 72.

Since many changes could be made in the above described devices and many apparently widely different embodiments of this invention could be made without departing from the scope thereof, it is intended that all matters contained in the above description or shown in the accoompanying drawings shall be interpreted as illustrative and not in a limiting sense.

What I claim is:

1. A process for converting light energy to mechanical energy, comprising the steps of: applying light energy to nitrocyl chloride confined in an enclosed space for photochemical dissociation thereof into nitrosyl oxide and chlorine; and converting the pressure increase resulting from said dissociation into physical motion.

2. A process as set forth in claim 1 comprising the additional step of altering the amount of light reaching said nitrosyl chloride.

3. A process according to claim 1 in which at least a part of the light applied consists of radiations having a wave length of less than 7500 A.

4. A process according to claim 1 in which the light applied consists of solar energy.

5. A solar energy converter for producing mechanical energy, comprising: a transparent receptacle having an access for light rays; a predetermined amount of nitrosyl chloride in said receptacle; a first cylinder communicating with said receptacle; a first piston movably disposed in said firstc ylinder so as to define a maximum and a minimum volume of expansion for said nitrosyl chloride; a stem secured to said piston; a second piston secured to said stem; a second cylinder surrounding said second piston; a reservior communicating at either side of said second piston with said second cylinder; a third cylinder having an inlet communicating with said reservoir and further having an outlet; electro-valve means in said inlet and outlet; a third piston in said third cylinder; a shutter secured to said third piston movably disposed in the access of light rays to said receptacle; and electric control switching means actuated by said stem for alternatively opening and closing said valve means so as to close said shutter when said first piston is in a position associated with maximum volume of expansion for said nitrosyl chloride and to open said shutter in the minimum volume position thereof.

6. A power engine comprising: means defining an enclosed space which does not substantially absorb light radiations, said space being subjected to light radiation, there being nitrosyl chloride within said space, said means including at least one movable surface, and a device providing periodical changes in the light intensity to which said enclosed space is exposed whereby said nitrosyl chloride periodically photo-chemically dissociates and recombines, resulting in a respectively alternatingly increasing and decreasing pressure in said space.

7. A power engine according to claim 6, wherein the movable surface to which is associated the enclosed space consists of a liquid substantially chemically inert to the action of nitrosyl chloride and its dissociation products.

8. A power engine according to claim 7 in which said liquid may dissolve a part of the gaseous nitrosyl chloride.

9. A power engine as set forth in claim 6 wherein said device providing periodical changes in the light intensity comprises, an adjustable shutter for blocking off light radiation from said space, and means interconnecting said movable surface and said shutter means for controlling the adjustment of the latter in response to the movement of said surface due to said pressure increase and decrease.

References Cited in the file of this patent

UNITED STATES PATENTS

| | | |
|---|---|---|
| 412,547 | Sherman | Oct. 8, 1889 |
| 1,343,577 | Okey | June 15, 1920 |
| 1,911,426 | Brodie | May 30, 1933 |
| 1,911,456 | Lyon | May 30, 1933 |
| 1,916,235 | Ruben | July 4, 1933 |
| 2,083,654 | Kochmann | June 15, 1937 |
| 2,740,626 | Hall | Apr. 3, 1956 |

FOREIGN PATENTS

| | | |
|---|---|---|
| 444,804 | Italy | Feb. 1, 1949 |
| 49,964 | Switzerland | Nov. 18, 1909 |